(12) United States Patent
Kahlon

(10) Patent No.: US 7,783,470 B2
(45) Date of Patent: Aug. 24, 2010

(54) VERIFICATION OF CONCURRENT PROGRAMS HAVING PARAMETERIZED QUALITIES

(75) Inventor: Vineet Kahlon, Princeton, NJ (US)

(73) Assignee: NEC Laboratories America, Inc., Princeton, NJ (US)

(*) Notice: Subject to any disclaimer, the term of this patent is extended or adjusted under 35 U.S.C. 154(b) by 333 days.

(21) Appl. No.: 11/867,160

(22) Filed: Oct. 4, 2007

(65) Prior Publication Data

US 2008/0086296 A1 Apr. 10, 2008

Related U.S. Application Data

(60) Provisional application No. 60/828,246, filed on Oct. 5, 2006, provisional application No. 60/884,048, filed on Jan. 9, 2007.

(51) Int. Cl.
G06F 9/45 (2006.01)
(52) U.S. Cl. .................. 703/22; 717/170; 717/129; 717/124; 717/123; 717/127
(58) Field of Classification Search .............. 703/13; 717/132
See application file for complete search history.

(56) References Cited

U.S. PATENT DOCUMENTS

2006/0218534 A1* 9/2006 Kahlon et al. ............ 717/124

OTHER PUBLICATIONS

Rinard, Martin. Analysis of Multithreaded Programs. [online] 2001 [retrieved on Nov. 12, 2009] Springer Database.*
Clarke et al. Automatic verification of finite-state concurrent systems using temporal logic specifications. [online] 1986 [retrieved on Nov. 14, 2009] ACM Database.*
Emerson et al. Model Checking Guarded Protocols. [online] 2003 [retrieved on Nov. 12, 2009] IEEE Database.*
Boyapati et al. Ownership Types for Safe Programming: Preventing Data Races and Deadlocks. [online] 2002 ACM Database.*
Chaki et al. Efficient Verification of Sequential and Concurrent C Programs. [online] 2004 [retrieved on Nov. 12, 2009]Springer Database.*
Kahlon, Vineet. Model Checking : Beyond the Finite. [online] 2004 [retrieved on Nov. 12, 2009] Proquest Database.*
Ivancic et al. Reasoning about Threads Communicating via Locks. [online] 2005 [retrieved on Nov. 13, 2009] Springer Database.*

(Continued)

Primary Examiner—Michael D. Masinick
Assistant Examiner—Cuong V Luu
(74) Attorney, Agent, or Firm—James Bitetto; Joseph Kolodka

(57) ABSTRACT

A system and method for computing dataflow in concurrent programs of a computer system, like device drivers which control computer hardware like disk drives, audio speakers, etc., includes, given a concurrent program that includes many similar components, initializing a set of reachable control states for interaction between concurrent programs. Based on the set of reachable control states, synchronization constructs are removed between the control states. The synchronization constructs are replaced with internal transitions. New reachable control states uncovered by the removal of the synchronization constructs are added where the new reachable control states are discovered using model checking for single threads. Data race freedom of the plurality of concurrent programs is verified by reviewing a complete set of reachable control states.

18 Claims, 5 Drawing Sheets

OTHER PUBLICATIONS

Chaki et al., Verifying Concurrent Message-Passing C Programs with Recursive Calls; TACAS, 2006; 15 pages.

German et al., Reasoning about Systems with Many Processes; J. ACM, vol. 39 No. 4; 1992; pp. 675-735.

Sen et al., Model Checking Multithreaded Programs with Asynchronous Atomic Methods; CAV, 2006; 14 pages.

Bouajjani et al., Reachability Analysis of Multithreaded Software with Asynchronous Communication; FSTTCS; 2005; 12 pages.

Bouajjani et al., A Generic Approach to the Static Analysis of Concurrent Programs with Procedures; IJFCS, vol. 14, No. 4; 2003; pp. 551-562.

Qadeer et al., Summarizing Procedures in Concurrent Programs; POPL; 2004; pp. 245-255.

* cited by examiner

VERIFICATION OF CONCURRENT PROGRAMS HAVING PARAMETERIZED QUALITIES

RELATED APPLICATION INFORMATION

This application claims priority to provisional application Ser. No. 60/828,246 filed on Oct. 5, 2006, incorporated herein by reference. This application also claims priority to provisional application Ser. No. 60/884,048 filed on Jan. 9, 2007, incorporated herein by reference.

The present application is related to U.S. application serial number (TBD) filed currently herewith, entitled "INTER-PROCEDURAL DATAFLOW ANALYSIS OF PARAMETERIZED CONCURRENT SOFTWARE" Ser. No. 11,867,178 and incorporated herein by reference.

BACKGROUND

1. Technical Field

The present invention relates to computer system verification and more particularly to verification of concurrent programs, which exploit parameterized qualities of computer systems comprised of many copies of the same hardware or software component.

2. Description of the Related Art

Computer verification is needed to ensure that a computer system operates properly and that the results obtained are trustworthy. One form of verification is testing. In testing, the actual behavior of a system is examined on a set on inputs and matched against an expected result. Due to a large or infinite number of possible inputs, it becomes impossible to confirm that a system behaves correctly in all circumstances.

Verification tries to address these issues. Verification provides a mathematical or model basis for simulating the system behavior. A model and its intended behavior are defined. A machine is usually modeled as a system whose state evolves over time, the model includes a specification of the state space and how the system can traverse it. Temporal logic has been shown to be useful in expressing behavior of reactive systems. The model-checking approach to verification includes taking the mathematical model of the system under consideration and checking the validity of a temporal logic formula within the model.

A primary problem faced by all methods is known as state explosion. State explosion means that the state space of the system under consideration grows rapidly (e.g., exponentially) with the amount of memory used (e.g., registers, or program variable, pointers, etc.). This limits the verification methods.

Multi-threading is a standard way of exploiting parallelism among different components of a computer system. As a result, the use of concurrent multi-threaded programs is becoming pervasive. Examples include operating systems, databases, embedded systems (cell phones, multimedia consumer products) etc. Since verification typically does not scale for large scale concurrent programs, there is a deep interest in leveraging static analysis techniques like inter-procedural dataflow analysis for debugging multi-threaded programs. While inter-procedural dataflow analysis has shown to be a very effective technique for finding bugs for sequential programs there has been very little work on extending such dataflow analyses to the concurrent domain.

SUMMARY

Dataflow analysis leverages the use of a very powerful paradigm of Pushdown Systems which is a broad framework that can represent many different kinds of dataflow analyses in a unified manner. The analog of PDS for the concurrent domain is the model of interacting PDSs. Unfortunately the problem of model checking interacting PDSs is decidable only for very restricted classes of properties.

In recent years, Pushdown Systems (PDSs) have emerged as a powerful, unifying framework for efficiently encoding inter-procedural dataflow analysis of sequential programs. A PDS has a finite control part corresponding to the valuation of the variables of the program and a stack which provides a means for model recursion. Dataflow analysis then exploits the fact that the model checking problem for PDSs is decidable for very expressive classes of properties—both linear and branching time. Not only has this powerful framework been useful in encoding the many different dataflow analyses but has, in many cases, led to strictly more expressive dataflow frameworks than those provided by classical inter-procedural dataflow analysis.

This highlights (i) the deep connection between dataflow analysis and the model checking problem for PDSs, and (ii) the usefulness of PDSs as a natural framework for modeling programs. Analogous to the sequential case, inter-procedural dataflow analysis for concurrent multi-threaded programs can be formulated as a model checking problem for interacting PDSs. However, this problem is less robustly decidable than the one for a single PDS. Indeed, a key undecidability result can show that even simple properties like reachability become undecidable for systems with just two PDSs synchronizing via CCS-style (CCS or calculus of communicating systems is a language for writing concurrent programs) pairwise rendezvous. The undecidability result can be shown to hold even for PDSs interacting via locks. The decidability/undecidability boundary can be precisely delineated for PDSs interacting via each of the standard synchronization primitives, e.g., locks, pairwise and asynchronous rendezvous and broadcasts. For PDSs interacting via locks, the model checking problem is decidable, if the locks are nested and correctness properties are restricted to the fragment L (X, F, $\bar{F}$). If, however, we allow the PDSS to interact via more expressive primitives like pairwise rendezvous and broadcasts, then decidability is guaranteed only for the (very restricted) fragment L(G, X). Here we use L($O_{pi}, \ldots O_{pk}$), where $O_{pi} \in \{X, F, U, G, \bar{F}\}$, to denote the fragment comprised of formulae of the form EF, where F is a double-indexed Linear Temporal Logic (LTL) formula in positive normal form (where only atomic propositions are negated) and built using the operators, $O_{p1}, \ldots, O_{pk}$ and the Boolean connectives V and Λ.

These results are useful in that they identify precisely those fragments of double-indexed LTL for which model checking is decidable thus improving the understanding of an important problem that lies at the very core of data flow analysis for concurrent programs. However, as an unfortunate corollary, we have that properties like data races which can be encoded as pairwise reachability, e.g., formulae of the form EF($c_1 \wedge c_2$), cannot be model checked for PDSs interacting via commonly used primitives like rendezvous and broadcasts. This is discouraging as data race freedom is among the most basic properties to be checked regarding concurrent programs. An analysis of these results reveals that the fundamental obstacle to a more tractable analysis of interacting pushdown systems is the undecidability of checking the non-emptiness of the intersection of two context-free languages. The implication is that if in a system comprised of two PDSs, the coupling between the two PDSs is strong enough to accept the intersection of the context free languages accepted by these PDSs, then the model checking problem becomes undecidable.

This strong coupling can be achieved either by making (i) the synchronization primitives sufficiently expressive, e.g., pairwise rendezvous or broadcasts, or (ii) the property being model checked strong enough. In principle, this is a formidable obstacle in the decidability of dataflow analysis of concurrent programs.

However, we exploit the key observation that, in practice, systems are, more often than not, parameterized, viz., comprised of many copies of a few basic types of subcomponents. It is worth emphasizing that this paradigm of system design, i.e., replication, is important in practice due to the simple fact that usually there is no good reason to design systems much differently. It is plainly advantageous for economic reasons to use and re-use many copies of the same basic subcomponent. Examples include important protocols for networking, cache coherence, synchronization; multi-core architectures running multi-threaded software, device drivers, among others. In the parameterized context, the model checking problem, often called the Parameterized Model Checking Problem (PMCP), is to decide whether a temporal property holds for a system $U^n$ comprised of an arbitrary number n of copies of a template process U. Indeed, we want to establish data race freedom for a system comprised of not just 2 or 3 threads executing a given device driver but an arbitrary number. Clearly, this is important as correctness of a system with a fixed number of threads does not in itself establish correctness for an arbitrary number of threads. In fact, there have been examples of drivers that have been proved to be correct for a 2 process instance but failed for a 3 process instance.

The PMCP case exists where U can be modeled as a finite state labeled transition system. It is difficult to model programs, particularly recursion, faithfully as finite state systems. Programs can be more accurately and naturally modeled as PDSs for which there is little prior work. We therefore consider the PMCP for PDSs interacting via each of the standard communication primitives, e.g., pairwise and asynchronous rendezvous, broadcasts, locks and boolean guards—both conjunctive and disjunctive. We focus on k-wise reachability, e.g., correctness properties of the form $EF(c_1 \wedge \ldots \wedge c_k)$, where $c_1, \ldots c_k$ are control states of the PDS modeling the template. Note that data races can be expressed as pairwise reachability.

A system and method for computing dataflow in concurrent programs of a computer system, like device drivers which control computer hardware like disk drives, audio speakers, etc., includes, given a concurrent program that includes many similar components, initializing a set of reachable control states for interaction between concurrent programs. Based on the set of reachable control states, synchronization constructs are removed between the control states. The synchronization constructs are replaced with internal transitions. New reachable control states uncovered by the removal of the synchronization constructs are added where the new reachable control states are discovered using model checking for single threads. Data race freedom of the plurality of concurrent programs is verified by reviewing a complete set of reachable control states.

Another system and method for computing dataflow in a computer program of a computer system includes modeling a concurrent program as a pushdown system with a number of configurations, initializing a set of reachable control states, based on the set of reachable control states, removing synchronization constructs, replacing the synchronization constructs with internal transitions, model checking the system to determine context-free reachability to find new control states for single threads, adding new reachable control states uncovered by the model checking, iterating until no new control states are found, and solving a parameterized model checking problem based on a complete set of reachable control states.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
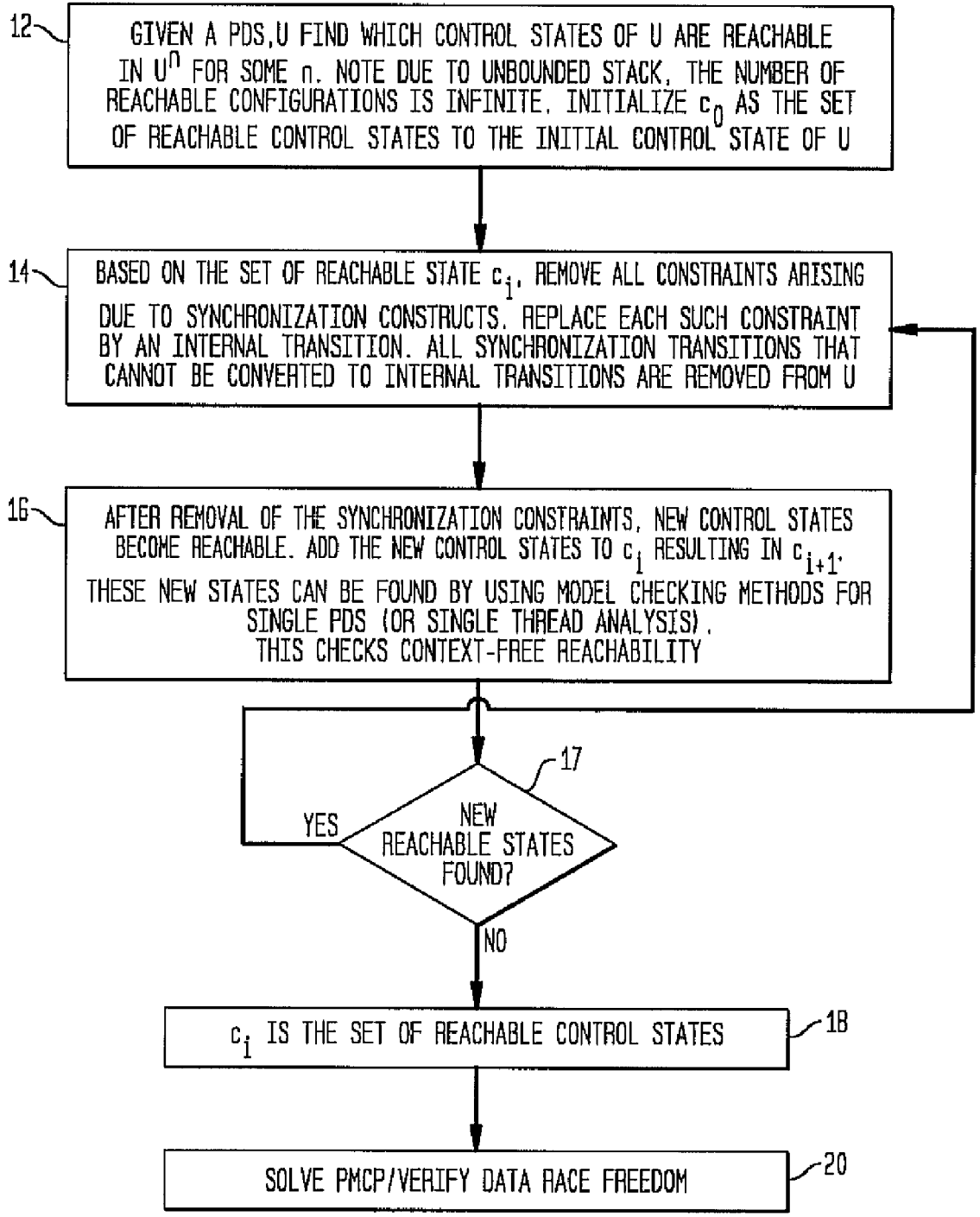
FIG. 1 is a block/flow diagram showing a system/method for solving a parameterized model checking problem in accordance with an illustrative embodiment.

The present embodiments relate to computer system verification and more particularly to verification of concurrent programs, such as, e.g., device drivers used for controlling hardware components like disk drives, audio speakers, etc. In particularly useful embodiments, parameterized qualities of computer systems are exploited in that the concurrent programs are comprised of many copies of the same hardware or software component. In addition, the present embodiments are applicable to other applications, such as, e.g., embedded software used in mobile devices like cell phones, personal digital assistants (PDAs), database software, SQL servers, application level software, like web browsers (Firefox™, Explorer™) or any application using concurrency.

Model checking of interacting pushdown systems is a core problem underlying dataflow analysis for concurrent programs. However, it is decidable only for very restricted temporal logic fragments. The fundamental obstacle is the undecidability of checking non-emptiness of an intersection of two context-free languages. It is not difficult to couple two different pushdown systems (PDSs) either by making the synchronization primitive expressive enough or the property being model-checked strong enough to accept precisely the intersection of the context free languages accepted by these PDSs. This results in the undecidability of the model checking problem. However, in accordance with the present principles, that many important classes of concurrent systems are parameterized is exploited, i.e., the classes are comprised of many replicated copies of a few basic type of components.

In accordance with the present principles, the general difficult problem need not be solved. We exploit the fact that many concurrent systems are parameterized, i.e., composed of many replicated copies of the same basic component. Indeed for most distributed protocols for networking, cache coherence, synchronization the same exact piece of code implementing the protocol is run on different machines thus making it parameterized. The Internet can be thought of as a network of computers, each running the TCP/IP protocol. Other examples include multi-core-architectures with multi-threading. Indeed, a device driver is supposed to run correctly irrespective of the number of threads executing it.

A new and efficient inter-procedural dataflow analysis system and method are provided for parameterized multi-threaded programs. The problem reduces to the problem of model checking interacting PDSs wherein all the PDSs are copies of each other. The prior work so far on analyzing parameterized programs has been restricted to models where there is no effective communication between the threads (PDSs) and is thus of little practical value. In the present disclosure, we have considered more powerful and realistic models wherein PDSs can interact via locks, rendezvous (e.g., WaitNotify( ) from Java™) or broadcasts (e.g., Wait NotifyAll( ) from Java™). Thus, inter-procedural analysis is extended to the parameterized concurrent domain for realistic models of communication.

In this case, it can be shown that for safety properties, the (parameterized) model checking problem is not only decidable, but efficient for PDSs interacting via pairwise and asynchronous rendezvous, disjunctive guards and nested locks. This is especially interesting given that the model checking problem for two (different) PDSs interacting via pairwise rendezvous is known to be undecidable for pairwise reachability—a cornerstone undecidability result for model checking interacting PDSs. This illustrates that the parameterized version of the problem is indeed more tractable. In accordance with the present principles, it is shown that for PDSs interacting via broadcasts, non-nested locks and conjunctive guards, the Parameterized Model Checking Problem (PMCP) remains undecidable thus delineating the decidability boundary for safety properties for all the standard synchronization primitives.

In accordance with the present disclosure, provably efficient methods for deciding the PMCP for PDSs interacting via pairwise rendezvous, nested locks and disjunctive guards are provided. It can be shown that for reaming primitives, e.g., broadcasts, conjunctive guards and non-nested locks, the PMCP is undecidable. Thus, we precisely delineate the boundary of the PMCP for k-wise reachability for each of the standard synchronization primitives.

We begin with the case where PDSs interact via pairwise rendezvous. Undecidability of two PDS interacting via pairwise rendezvous for pair-wise reachability has been a cornerstone of undecidability for model checking interacting PDSs. We show that the PMCP for PDSs interacting via pair-wise rendezvous is not only decidable but efficiently decidable. This illustrates that switching to the parameterized version of the problem does indeed make it more tractable.

It should be understood that the elements shown in the FIGS. may be implemented in various forms of hardware, software or combinations thereof. Preferably, these elements may be stored on computer media and are implemented in software, on one or more appropriately programmed general-purpose digital computers having a processor and memory and input/output interfaces. Software may include but is not limited to firmware, resident software, microcode, etc.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Embodiments can take the form of a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be an electronic, magnetic, optical, electromagnetic, infrared, or semiconductor system (or apparatus or device) or a propagation medium. For example, the medium may include a computer-readable medium such as a semiconductor or solid state memory, magnetic tape, a removable computer diskette, a random access memory (RAM), a read-only memory (ROM), a rigid magnetic disk and an optical disk, etc.

To provide some intuition for our new methods, recall that for the case where U is a finite state labeled transition system (without a stack), the problem of deciding parameterized reachability can be solved efficiently by a simple known fixpoint method. Start with the set $R_0$ containing the initial state of U and in each iteration, construct a set $R_{i+1}$ of control states from $R_i$ by adding new control states b, where there exists either an internal transition of the form a→b with a $\in R_i$, or there exists a pairwise rendezvous send(receive) transition of the form a $\xrightarrow{p}$ b with a matching receive(send) transition c $\xrightarrow{p}$ d where both a and c are in $R_i$. Note that if the number of control states Q is finite then the above process is guaranteed to terminate in |Q| steps.

If, however, the template U is a PDS with infinitely many configurations, then the above procedure may not be guaranteed to work. Moreover, even if it does terminate, the above procedure takes into account only the constraints arising out of synchronization via pairwise rendezvous. If the given template is a PDS, we have to additionally make sure that that a control state being included in each step of the fixpoint computation is context-free reachable. A new procedure is provided in accordance with the present principles that takes into account both of these constraints.

Referring now to the drawings in which like numerals represent the same or similar elements and initially to FIG. 1, given a PDS U, for a concurrent program comprised of many similar components, e.g., device drivers which run hardware like disk drives, audio speakers, etc, initializing a set of reachable control states to determine control states of U which are reachable in $U^n$ for some n in block 12. Note that due to the unbounded stack, the number of reachable configurations could be infinite. A PDS may be a model of a device driver or used to represent a program or software code employed in handling concurrent threads during its operation.

Initialize $c_0$, where $c_0$ is the set of reachable control states to the initial control state of U. The initialization is performed from 0 to i to initialize all states. We start with the set $R_0 = \{c_0\}$ containing only the initial state $c_0$ of U and then construct a series of sets $R_0 \ldots, R_m$, where $R_{i+1}$, is obtained from $R_i$ by adding new control states that become parameterized reachable, e.g., reachable in $U^n$ for some n, assuming that all states in $R_i$ are parameterized reachable. In block 14, based on the set of reachable states $c_i$, remove all constraints arising due to synchronization constructs. Replace each constraint by an internal transition. All synchronization transitions that cannot be converted to internal transitions are removed from U.

All synchronization constraints arising out of rendezvous emanating out from a control state in $R_i$, which we know is already parameterized reachable, can be always satisfied. This permits conversion of all transitions of the form a $\xrightarrow{p}$ b such that there exists a transition of the form c $\xrightarrow{p}$ d, where p and p' are matching send and receive rendezvous actions and c ∈ $R_i$ to an internal transition of the form a $\xrightarrow{r}$ b. We can define $U_{i+1}$ to be the template that is obtained from U by replacing the pairwise rendezvous send/receive transitions described above with internal transitions and removing the remaining rendezvous send and receive transitions.

Then, to check if the second constraint, i.e., context-free reachability, is satisfied, we use an efficient procedure for model checking PDSs in block 16. We determine the set $R_c^i$ of reachable control states in the (individual) PDS $U_i$. If $R_c^i \not\subseteq R_i$, then define $R_{i+1} = R_i \cup R_c^i$. The above method is repeated until we reach a fixpoint, e.g., fixpoint computation. Fixpoint computation is a procedure to discover new states based states already reachable until no new states can be found. For example, start with the initial state of the system being checked. Then, find what states are reachable from the initial state and mark these as reachable. Next, check what new states are reachable from the initial state as well as the states reached in the last step and so on until no new states can be found and then stop.

Note that during each iteration, as more context-free reachable (internal transition) states from the previous iteration are added, more synchronization constraints can be removed which in turn make yet more states context-free reachable. In block 16, these new control states are added to $c_i$ resulting in $c_{i+1}$. These new states can be found by using model checking for a single PDS. i is then set to i+1. A PDS may be created by, e.g., taking a program for a given device driver, and removing information such as assignment statements and conditional statements that are not pertinent to what is being checked and can therefore be discarded. This is called abstract interpretation. After abstract interpretation, we reduce the program to have finite control and recursion which can then be translated to a PDS which has finite control and a stack (that is used to model recursion).

In block 17, a check as to whether or not any new reachable states were found is made. If new reachable states were found, the path returns to block 14 where synchronization constructs are again removed and replaced with internal transitions and the program continues. In no new reachable states are found, the path continues to block 18, where $c_i$ is a complete set of reachable states.

In block 20, the parameterized model checking problem (PMCP) is solved based on the complete set of reachable control states. This verifies certain criteria such data race freedom of other facts of the computer system.

Thus, in some sense the checking of the synchronization and context-free reachability constraints are dovetailed, e.g., performed in an interleaved fashion until a fixpoint is reached in that no new states can be added. This method is provably efficient and terminates in $O(|U|)^4$ times, where $|U|$ is the size of the PDS describing the template. A similar efficient fixpoint method can be given for parameterized families of PDSs interacting via asynchronous rendezvous and disjunctive guards and non-nested locks.

Another consideration includes that for PDSs interacting via broadcasts, conjunctive guards and non-nested locks, the problem, in general, remains undecidable. Essentially this is so because such a parameterized system can mimic a system comprised of two different PDSs interacting with the same primitive, which then permits taking the intersection accepted by the context free languages.

System Model: Consider a family of concurrent programs of the form if comprised of an arbitrary number n of copies of a template process (thread) U modeled as a pushdown system (PDS). A PDS has a finite control part corresponding to the valuation of the variables of the thread it represents and a stack which models recursion. Formally, a PDS is a five-tuple $\underline{P} = (P, Act, \Gamma, c_0, \Delta)$, where P is a finite set of control locations, Act is a finite set of actions, $\Gamma$ is a finite stack alphabet, and $\Delta \subseteq (P \times \Gamma) \times Act \times (P \times \Gamma^*)$ is a finite set of transition rules. If $((p, \gamma), a, (p', w)) \in \Delta$ then we write $(p, \gamma) \xrightarrow{a} (p', w)$. A configuration of $\underline{P}$ is a pair (p, w), where p∈P denotes the control location and w∈$\Gamma^*$ the stack content. We call $c_0$ the initial configuration of $\underline{P}$. The set of all configurations of $\underline{P}$ is denoted by C. For each action a, we define a relation $\xrightarrow{a} \subseteq C \times C$ as follows: if $(q, \gamma) \xrightarrow{a} (q', w)$, then $(p, \gamma v) \xrightarrow{a} (p', wv)$ for every $v \in \Gamma^*$.

We use $\{U\}^n$ to denote the family of concurrent programs, $U^2, U^3, \ldots$, where $U^m$ denotes the interleaved parallel composition of m copies of the template U. The ith copy of U, denoted by U[i], communicates with the other copies via the standard synchronization primitives—locks, pairwise and asynchronous rendezvous, broadcasts and boolean guards—both conjunctive and disjunctive. Pairwise rendezvous are inspired by CCS where asynchronous rendezvous and broadcasts are used to model the Wait/Notify, and Wait/NotifyAll primitives of Java™. The semantics of $U^n$ is defined in the usual way and is therefore omitted for simplicity.

We distinguish between nested and non-nested locks. A concurrent program accesses locks in a nested fashion if along each computation of the program a thread can only release the last lock that it acquired along that computation and that has not yet been released.

Correctness Properties: One of the important properties to check in multi-threaded programs is the absence of data races. The dual property, e.g., presence of a data race, can be expressed as follows: $\exists n: U^n | = EF(c_1 \wedge c_2)$, where $c_1$ and $c_2$ are control locations of U, corresponding to program statements where the same shared variable is being accessed. We therefore consider the PMCP for properties of the form $EF(c_1 \wedge, \ldots, \wedge c_k)$, where $c_1, \ldots, c_k$ are control locations of U. Formally, the problem is to decide whether $\exists n: U^n | = EF(c_1 \wedge, \ldots, \wedge c_k)$.

Pairwise and Asynchronous Rendezvous: We start by considering the model checking problem for safety properties for parameterized systems of PDSs interacting via pairwise rendezvous. Unlike the non-parameterized case where the model checking problem for systems with even two PDSs becomes un-decidable, we show that for parameterized systems the model checking problem is not only decidable, but efficiently so.

Let $\{U^n\}$ be the parameterized family defined by a template process U modeled as a PDS synchronizing via pairwise rendezvous. Here, $\Sigma$, the set of action symbols of U, is comprised of the set $\Sigma_{in}$ of internal transition labels; and the sets $\Sigma_{pr} \times \{!\}$ and $Z_{pr} \times \{?\}$ of send and receive pairwise rendezvous transitions, respectively. We assume that synchronizing transitions, e.g., those labeled by actions in $\Sigma_{pr} \times \{!\} \cup \Sigma_{pr} \times \{?\}$, do not modify the stack of the PDS executing the transition. For action l ∈$\Sigma_{pr}$, a pair of transitions labeled with l! and l? are called matching. We recall that for pr ∈$\Sigma_{pr} \times \{!\} \cup \Sigma_{pr} \times \{?\}$, transition $tr_1$: a $\xrightarrow{pr}$ b of a process U[i] of $U^n$ is enabled in global configuration s, if there exists a process U[j] of $U^n$, where j≠i, in local state c such that there exists a matching transition of the form $tr_2$: c $\xrightarrow{pr}$ d in $\Delta$. To execute the rendezvous, both the pairwise send and receive transitions $tr_1$ and $tr_2$ are to be fired synchronously in one atomic step.

Our strategy for deciding the PMCP is as follows. We first show that the PMCP for $EF(c_1 \wedge, \ldots, \wedge c_k)$ can be reduced to the PMCP for reachability of individual control states, e.g., $EF_c$, where c is a control state of U. Then, we give a new, efficient method for deciding the PMCP for reachability of individual control states. We start with the following definition.

Definition 1. (Parameterized Reachability) We say that a control state c (configuration c) of template process U is parameterized reachable if there exists a reachable global configuration s of $U^n$, for some n, with a process in control state c (configuration c).

We begin by showing that if a configuration c of U is parameterized reachable then given 1, for some k, there exists a reachable global state s of $U^k$ with at least 1 copies of c. In other words, we can pump up the multiplicity of each parameterized reachable configuration of U to any arbitrarily large value. This relieves us of the burden of tracking the multiplicity of each configuration of U. Formally, we show the following.

Proposition 1. (Unbounded Multiplicity). Let R be the set of all parameterized reachable configurations of U and let R' be a finite subset of R. Then, given 1, for some m, there exists a finite computation of $U^m$ leading to a global state s with at least 1 copies of each configuration in R.

Corollary 1. $\exists n : U^n \models EF(c_1^\wedge, \ldots, ^\wedge c_k)$ if for each i $\in [1 \ldots k]$, $c_i$ is parameterized reachable. This result reduces the PMCP for $EF(c_1^\wedge, \ldots, ^\wedge c_k)$, to the PMCP for $EF_c$, where c is a control state of U. Consequently, we shall focus on this problem.

PMCP for Control State Reachability: For the case where U is a finite state labeled transition system (without a stack), the problem of deciding parameterized reachability of a control state can be solved efficiently by a simple fixpoint method. We start from the set $R_0$ containing only the initial state of U. In each iteration, we construct the set $R_{i+1}$ of control states from $R_i$ by adding new control states b, where there either exists an internal transition of the form a->b with a $\in R_i$, or there exists a pairwise rendezvous send(receive) transition of the form a->b with a matching receive(send) transition c->d where both a and c are in $R_i$. Note that if the number of control states Q is finite then the above procedure is guaranteed to terminate in |Q| steps.

If, however, the template U is a PDS, then the above procedure is not guaranteed to work. Indeed, consider a simple template U with two control states a and b, stack alphabet {α, β}, and a single internal transition tr:

$$a \xrightarrow{a \to \alpha\beta} b.$$

Since the stack of each process U[i] in the system $U^n$ is empty to start with, transition tr can never be executed. Thus, b is not parameterized reachable even though if we execute the above method on the control states of U while ignoring the stack operations, b would be reachable. Apart from ensuring that the synchronization constraints imposed by pairwise rendezvous are satisfied, we also need to make sure that new control states being included in $R_{i+1}$ in each step of the fixpoint computation are context-free reachable from existing reachable states in $R_i$.

Figure 2:
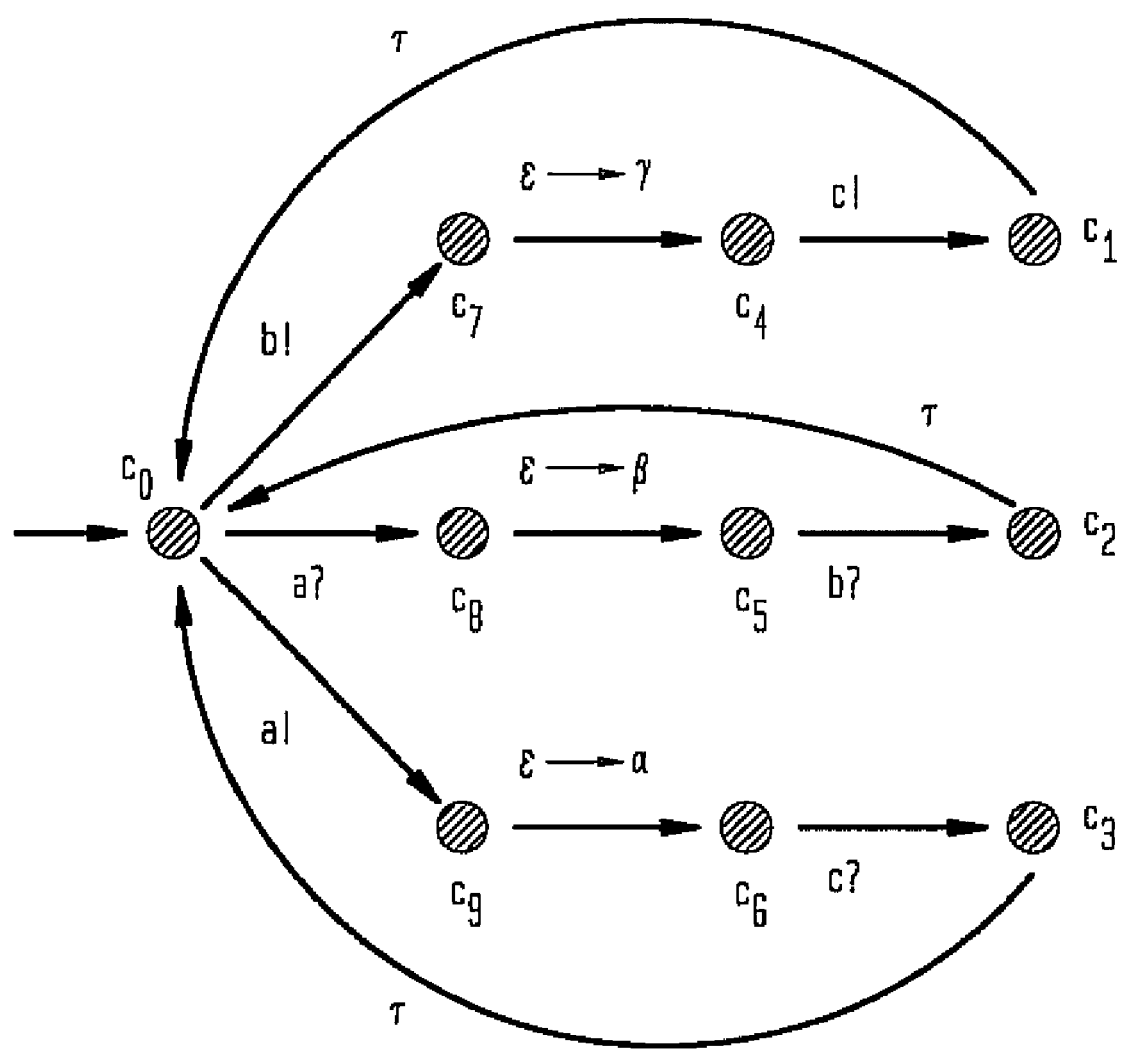
FIG. 2 is a diagram showing a template process U with control states c and transitions designation with ! and ? for demonstrating operation in accordance with the present principles.
Figure 3:
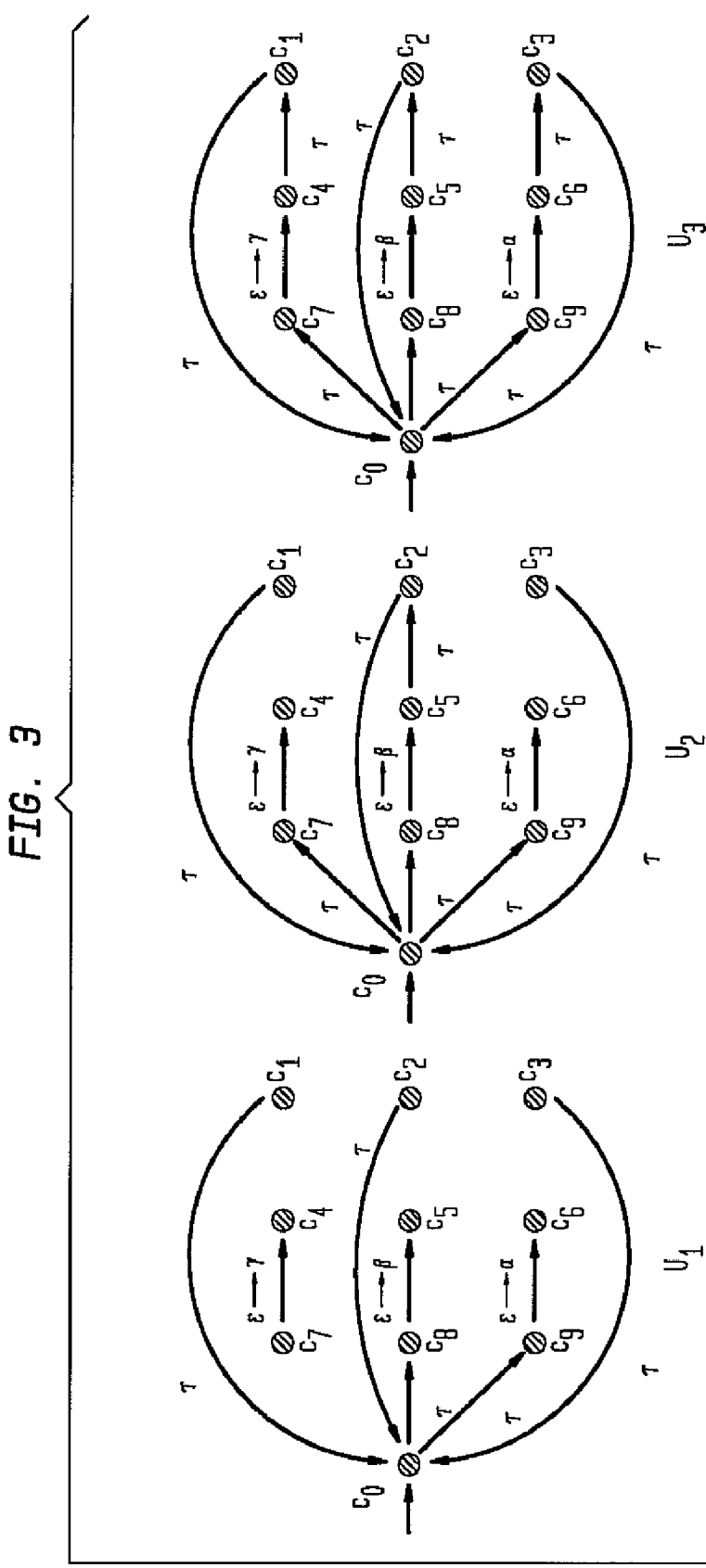
FIG. 3 is a diagram showing a fixpoint computation in accordance with the present principles showing progression through several iterations.

Referring to FIGS. 2 and 3, a method for deciding the PMCP for parameterized control state reachability via is illustratively depicted. Consider the template process U shown in FIG. 2. Suppose that it is desired to decide whether for some n, $EF_{c1}$. We start with the set $R_0 = \{c_0\}$ containing only the initial state $c_o$ of U. We then construct a series of sets where $R_{i+1}$ is obtained from $R_i$ by adding new control states that become parameterized reachable assuming that all states in $R_i$ are parameterized reachable.

As noted above, $R_{i+1}$ cannot be obtained from $R_i$ by merely taking the union of $R_i$ with control states b where there is either an internal transition of the form a→b or a pair of rendezvous send and receives of the form $a \xrightarrow{n} b$ and $c \xrightarrow{n} d$, with a and c$\in R_i$. This step handles only the synchronization constraints. Additionally, we also need to test whether a control state being added is context-free reachable given that all states in $R_i$ are parameterized reachable. These two classes of constraints are handled in a dovetailed fashion.

First, to satisfy the synchronization constraints, we convert all transitions of the form $a \xrightarrow{p} b$ such that there exists a transition of the form $c \xrightarrow{p'} d$, where p and p' are matching send and receive rendezvous actions with c$\in R_i$ to an internal transition of the form $a \xrightarrow{\Sigma} b$, where Σ is a newly introduced special action symbol in $\Sigma_{in}$. This is motivated by the fact that since c is parameterized reachable, we can, via proposition 1, ensure that if a becomes parameterized reachable (now or in some future iteration), then, for some m, there exists a reachable global state of $U^m$ with a process each in local states a and c. In other words, if a becomes reachable, the rendezvous transition $a \xrightarrow{p} b$ can always be enabled and executed. Thus, it can be treated like an internal transition. In this way, by flooding all the control states of $R_i$, we can remove all the synchronization constraints arising out of pairwise send or receive transitions emanating from control states in $R_i$. This will enable every rendezvous transition with a matching send/receive starting at a control state in $R_i$. Such transitions can therefore be replaced by internal transitions. Motivated by this, we define $U_{i+1}$ to be the template that we get from $U_i$ by replacing the appropriate pairwise rendezvous send/receive transitions as described above with internal transitions and removing the remaining rendezvous send and receive transitions.

To check the second constraint, e.g., context-free reachability, we can now use any procedure for model checking PDSs, to determine the set $R_c^i$ of those control states of U that are reachable in the individual PDS $U_i$. This gives us the set $R_c^i$ of all the context free reachable states in $U_i$. If new control states become reachable via removal of some synchronization constraints in the previous step, they are added to $R_{i+1}$; else we have reached a fixpoint and the procedure terminates.

In this example, $R_0$ is initialized to $\{c_0\}$. This enables both the transitions $c_0 \xrightarrow{a} c_9$ and $c_0 \xrightarrow{a'} c_8$ and hence both of these can be converted to internal transitions resulting in the template $U_i$ shown in FIG. 3. In the second iteration, we note that $c_5$, $c_6$, $c_8$ and $c_9$ are all reachable control states of template $U_1$, and so $R_1 = \{c_0, c_5, c_5, c_8, c_9\}$. Now, since both $c_0$ and $c_5$ are in $R_1$, the rendezvous transitions $c_5 \xrightarrow{b'} c_2$ and $c_0 \xrightarrow{b} c_7$ become enabled and can be converted to internal transitions resulting in the template $U_2$. In $U_2$, control states $c_2$, $c_4$ and $c_7$ now become reachable and are therefore added to $R_2$ resulting in $R_3 = \{c_0, c_2, c_4, c_5, c_6, c_7, c_8, c_9\}$. Finally, since both the control states $c_4$ and $c_6 \in R_3$, the rendezvous transitions $c_6 \xrightarrow{n} c_3$ and $c_4 \xrightarrow{a} c_1$ are converted to internal transitions resulting in the template $U_3$. Since $c_1$ and $c_3$ are reachable control locations of $U_3$, these control locations are now included in the $R_4$ thereby reaching a fixpoint leading to termination of the method. A description of the method is given below in METHOD A.

The Parameterized Model Checking Problem for control state reachability, and hence k-wise reachability, for systems composed from a template PDS U interacting via pairwise rendezvous can be decided in $O(|Q|^4)$ time, where Q is the set of control states of U.

METHOD A: Parameterized Control State Reachability for Rendezvous:

1. Initialize i=0 and $R_0=\{c_0\}$, where $c_0$ is the initial state of U.
2. Repeat
3. i=i+1
4. Construct PDS $U_i$ by replacing each pairwise send(receive) transition of template U of the form $a \xrightarrow{\pi} b$, such that there exists a matching receive(send) transition of the form $c \xrightarrow{\pi} d$ where $c \in R_{i-1}$ by the internal transition $a \xrightarrow{\pi} b$ and removing the remaining pairwise send or receive rendezvous transitions.
5. Compute the set $R_c^i$ of reachable control locations of $U_i$ using a procedure for model checking individual PDSs.
6. Set $R_i = R_{i-1} \cup R_c^i$
7. Until $R_i \not\subseteq R_{i-1}$
8. Return $R^i$ Asynchronous Rendezvous: A method for deciding the PMCP for PDSs interacting via asynchronous rendezvous, which are more expressive than pairwise rendezvous, is very similar to METHOD A. A minor modification accounts for the slightly different semantics of an asynchronous rendezvous. The only difference is that an asynchronous send transition $a \xrightarrow{\pi} b$ can be executed irrespective of whether a matching receive $c \xrightarrow{\pi} d$ is present or not. A receive transition, on the other hand, does need a matching send to be currently enabled with both the send and receive transitions then being fired atomically. Now, constructing PDS $U_i$ in METHOD A is modified as follows: Replace each pairwise send transition of template U of the form $a \xrightarrow{\pi} b$, with the internal transition $a \xrightarrow{\pi} b$. On the other hand, to replace a receive transition of the form $a \xrightarrow{\pi} b$ with the internal transition $a \xrightarrow{\pi} b$, we need to test whether there exists a matching send transition of the form $c \xrightarrow{\pi} d$ with $c \in R_{i-1}$. The remaining receive asynchronous rendezvous transitions are removed. The time complexity of the method remains the same.

Disjunctive Guards: We consider PMCP for PDSs interacting via disjunctive guards. Here transitions of U are labeled with guards that are boolean expressions of the form $\vee(c_1 \vee \ldots \vee c_k)$, with $c_1, \ldots, c_k$ being control states of U. In copy U[i] of template U in $U^n$, a transition $$a \xrightarrow{(c_1 \vee \ldots \vee c_k)} b$$

of U is rewritten as a transition of the form $$a \xrightarrow{\vee_{j \neq i}(c_1 \vee \ldots \vee c_k)} b.$$

In $U^n$, such a transition of U[i] is enabled in a global configuration of $U^n$ if there exists a process U[j] other than U[i] in at least one of the local states $c_1, \ldots, c_n$. Concurrent systems with processes communicating via boolean guards are motivated by Dijkstra's guarded command model. Dijkstra's guarded command model is known in the art. The PMCP for finite state processes communicating via disjunctive guards can be shown to be efficiently decidable. The broad approach for deciding the PMCP for PDSs interacting via disjunctive guards is similar to that for PDSs interacting via pairwise rendezvous though the technical details are different. As before, we start by showing that the unbounded multiplicity result holds.

Proposition 2. (Unbounded Multiplicity). Let R be the set of all parameterized reachable configurations of a PDS U interacting via disjunctive guards and let R' be a finite subset of R. Then, given l, for some m, there exists a finite computation of $U^m$ leading to a global state s with at least l copies of each configuration in R'. Thus, as was the case for PDSs interacting via pairwise rendezvous, the problem now reduces to deciding the PMCP for control state reachability. We illustrate the procedure via a simple example.

Figure 4:
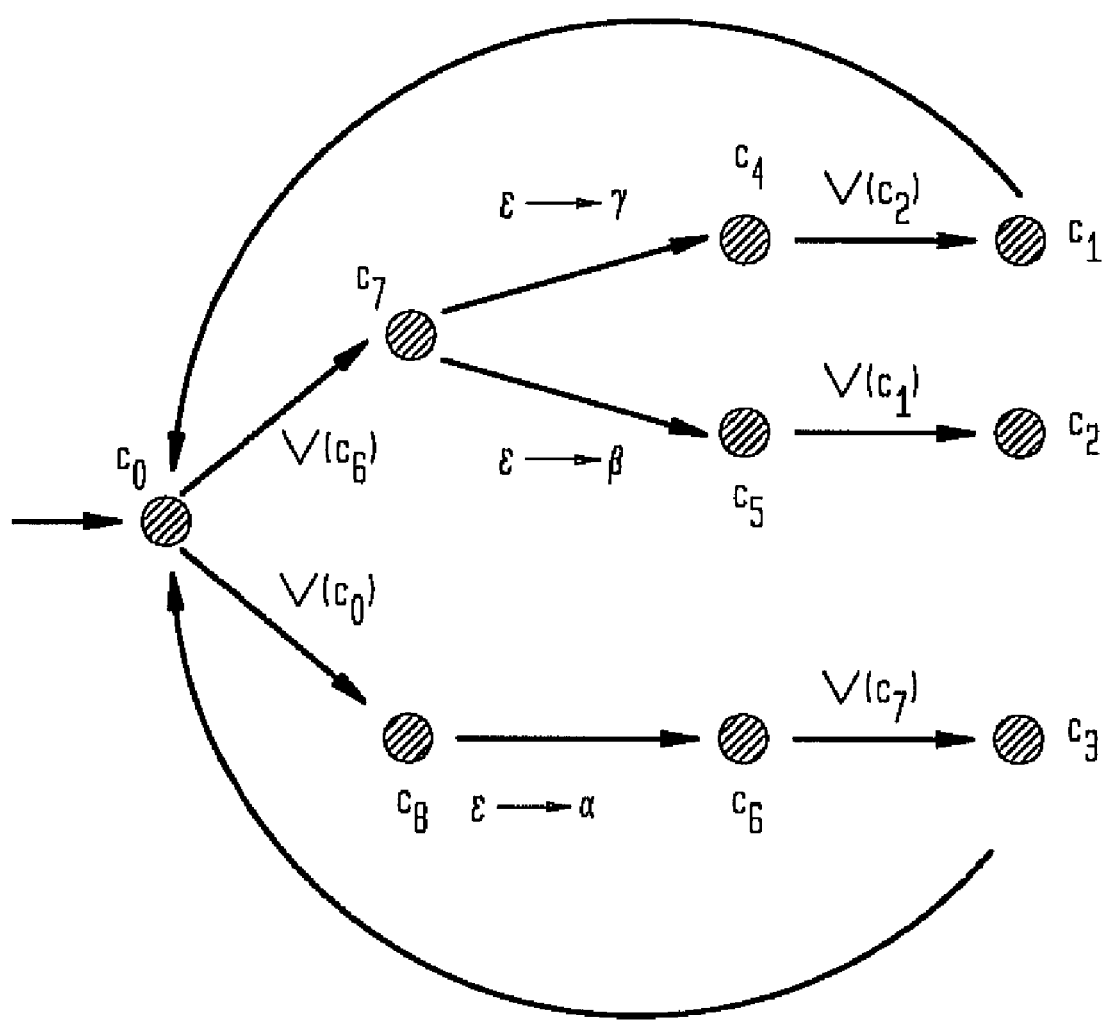
FIG. 4 is a diagram showing a template U with disjunctive guards for transitions between states c for demonstrating operation in accordance with another embodiment in accordance with the present principles.
Figure 5:
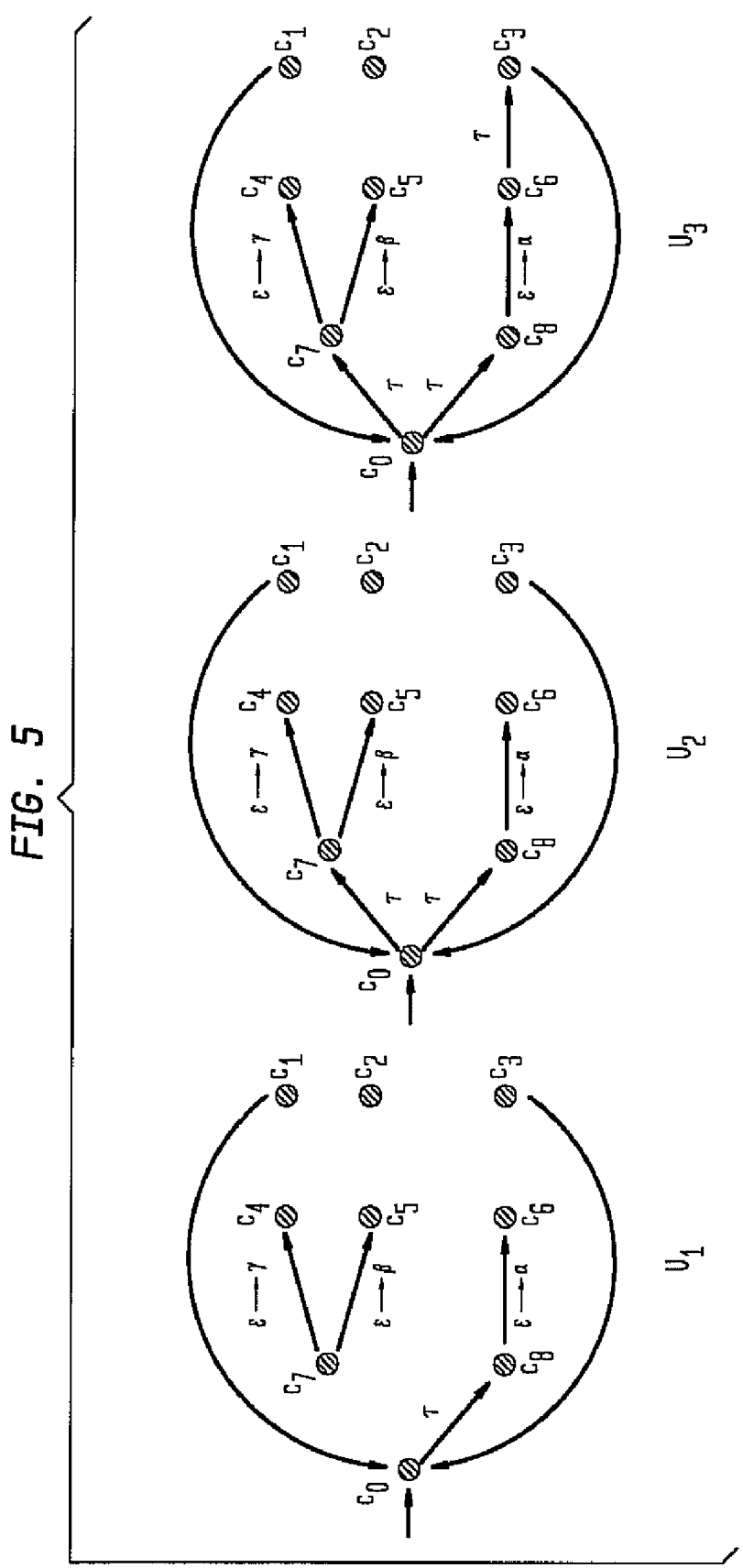
FIG. 5 is a diagram showing a fixpoint computation in accordance with the present principles showing progression through several iterations.

Referring to FIGS. 4 and 5, an illustrative template process U is shown. Suppose that we want to decide whether for some n, $U^n \models EF_{c_1}$. We start with the set $R_0=\{c_0\}$ containing only the initial state $c_0$ of U. We then construct a series of sets $R_0, \ldots, R_m$, where $R_{i+1}$ is obtained from $R_1$, by adding new control states that become parameterized reachable assuming that all states in $R_i$ are parameterized reachable.

When constructing $R_{i+1}$ from $R_i$, we need to make sure that a new control state is added to $R_{i+1}$ only if it was reachable under the constraints imposed by (i) synchronization via disjunctive guards, and (ii) context-free reachability. To accomplish this, all transitions of the form $$a \xrightarrow{\vee(c_1 \vee \ldots \vee c_k)} b$$

where for some j, $c_j \in R_i$ were converted to an internal transition of the form $a \xrightarrow{\pi} b$. This is motivated by the fact that since $c_j$ is parameterized reachable, the transition $$a \xrightarrow{\vee_{j \neq i}(c_1 \vee \ldots \vee c_k)} b$$

can always be enabled by ensuring, via proposition 2, that for some j, there exists a process in local state $c_j$. Then, as before, by flooding all the control states of $R_i$, we can remove all the synchronization constraints arising out of disjunctive guards which have one of the states occurring in $R_i$ as a disjunct. This will enable every transition labeled with such a guard which can therefore be replaced by internal transitions. Motivated by this, let $U_{i+1}$ be the template that we get from U by replacing the appropriate transitions labeled with disjunctive guards as described above with internal transitions and removing the remaining guard-labeled transitions. Then, using the efficient procedure for model checking PDSs, we determine the set $R_c^i$ of reachable control states in the (individual) PDS $U_i$. If $R_c^i \not\subseteq R_i$ then define $R_{i+1} = R_i \cup R_c^i$.

In this example, $R_0$ is initialized to $\{c_0\}$. This enables transition $$c_0 \xrightarrow{\vee_{jcl}} c_8$$

which can therefore be converted into an internal transition resulting in the template U1 shown in FIG. 5. In the second iteration, we note that $c_0$, $c_6$ and $c_8$ are reachable control states of template $U_1$ and so $R_1=\{c_0, c_6, c_8\}$. Now, since $c_0 \in R_1$ transition $$c_0 \xrightarrow{\vee_{rfi}} c_7$$

becomes enabled and can be converted to an internal transition resulting in the template $U_2$. In $U_2$, control states $c_4$, $c_5$ and $c_7$ now become reachable and are therefore added to $R_2$ resulting in $R_3=\{c_0, c_1, c_4, c_5, c_6, c_7, c_8\}$. Since $c_7 \in R_3$, transition $$c_6 \overset{\vee r_7}{\to} c_3$$

is converted to an internal transition resulting in the template $U_3$ thereby reaching a fixpoint and leading to termination of the method. Note that control states $c_1$ and $c_2$ are not parameterized reachable. A description of METHOD B is given below.

METHOD B: Parameterized Control State Reachability for Disjunctive Guards:

1. Initialize i=0 and $R_0=\{c_0\}$, where $c_0$ is the initial state of U.
2. Repeat
3. i=i+1
4. Construct PDS $U_i$ by replacing each transition of U of the form $$a \overset{\vee(c_1 \vee \ldots \vee c_k)}{\to} b$$

where for some j, $c_j \in R_{i-1}$, by the internal transition $a \to b$ and removing the remaining transitions labeled with a disjunctive guard.

5. Compute the set $R_c^i$ of reachable control locations of $U_i$.
6. Set $R_i = R_{i-1} \cup R_c^i$
7. Until $R_i \not\subseteq R_{i-1}$
8. Return $R_i$ METHOD B returns the set of parameterized reachable control states of U. Complexity Analysis: as before, the entire METHOD B runs in $0(|Q|^4)$. The Parameterized Model Checking Problem for control state reachability, and hence k-wise reachability, for systems composed from a template PDS U inter-acting via disjunctive guards can be decided in $0(|Q|^4)$ time, where Q is the set of control states of U.

Locks: We consider the PMCP for $EF(c_1 \wedge, \ldots, \wedge c_k)$ for PDSs interacting via locks. The problem is decidable for PDS with nested locks but undecidable for ones with non-nested locks.

This shows that although the model checking problem for PDSs with pairwise rendezvous becomes decidable when we consider its parameterized version, it is not the case for locks. We start with the case of nested locks. For the sake of simplicity, we consider the PMCP for properties of the form $EF(c_1 \wedge c_2)$. We have that for $n \geq 2$, $U^n|=EF(c_1 \wedge c_2)$ if $U^2|=EF(c_1 \wedge c_2)$. This reduces the problem of deciding the PMCP for $EF(c_1 \wedge c_2)$ to a standard model checking problem for a system with two PDS interacting via nested locks which was shown to be efficiently decidable. We have that the PMCP for $EF(c_1 \wedge, \ldots, \wedge c_k)$ is decidable. For the case of non-nested locks, the PMCP for $EF(c_1 \wedge c_2)$ is undecidable for PDSs interacting via non-nested locks.

Broadcasts: For parameterized families of systems comprised of templates interacting via broadcasts, the problem of deciding parameterized control state reachability, e.g., $\exists n:U^n|=EF_c$, where c is a control state of U, is undecidable. The problem of deciding parameterized pairwise reachability for PDSs interacting via broadcasts is undecidable.

Conjunctive Guards: For parameterized systems wherein PDSs interact via conjunctive guards, the problem of deciding parameterized control reachability is undecidable.

The present principles include a new method for the inter-procedural dataflow analysis of parameterized concurrent software. There are two main advantages. First, the systems and methods are applicable to realistic and expressive models of communication as opposed to existing techniques which either do not assume any effective communication between threads, or use over-approximation heuristics like widening. Secondly, the present systems and methods are more scalable and efficient than prior techniques as they reduce the analysis for a program with multiple threads to augmented versions of the individual threads.

Furthermore, the present embodiments are both provably efficient and exact, e.g., sound and complete. We reduce the inter-procedural dataflow analysis of a concurrent program comprised of multiple threads communicating via locks, to multiple instances of the reachability problem, e.g., whether a given set of states of a program is reachable from another given state. Essentially, to perform reachability, we need to test that (1) constraints imposed by synchronization primitives between threads are satisfied, and (2) context-free reachability (arising due to recursion) holds. We do this in a dovetailed, i.e., interleaved manner.

Value of the new verification method includes: 1) extending inter-procedural dataflow analysis to the parameterized concurrent domain for realistic models of communication among threads. The present embodiments model all the standard Java™ communication primitives. Existing techniques consider only models without any effective communication. 2) The present systems and methods are faster than existing techniques, with a time complexity that is polynomial in the size of one thread (one PDS). 3) The present embodiments are more scalable, i.e., can potentially verify larger programs than existing techniques. This is accomplished by avoiding construction of the global state space of the given program thus bypassing the state explosion problem. The analysis is reduced from a concurrent multi-threaded program to its individual threads. 4) The present embodiments are both sound and complete, thus avoiding bogus error traces that could be generated by less precise techniques. This is important from a commercial standpoint as most of the resources spent in real life verification go into detecting/avoiding bogus error traces. The present embodiments are simple to implement and can easily be incorporated into existing tool flows.

Having described preferred embodiments of a system and method for model checking parameterized threads for safety (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for computing dataflow in concurrent programs of a computer system, comprising:
given a concurrent program stored on a computer readable storage medium, initializing a set of reachable control states;
based on the set of reachable control states, removing synchronization constructs between the control states that cannot be converted to internal transitions;

replacing the synchronization constructs with internal transitions;
adding new reachable control states uncovered by the removal of the synchronization constructs where the new reachable control states are discovered using model checking for single threads;
repeating the steps of removing, replacing and adding until there are no more reachable control states; and
verifying data race freedom of the plurality of concurrent programs by reviewing a complete set of reachable control states.

2. The method as recited in claim 1, further comprising checking context-free reachability of the control states.

3. The method as recited in claim 1, further comprising iterating until no new control states are found.

4. The method as recited in claim 1, wherein new control states are discovered based on whether there is a path in the program comprised only of internal transitions starting from the initial state.

5. The method as recited in claim 1, wherein replacing the synchronization constructs includes replacing a rendezvous send (receive) transition starting from an already reached control state with a matching receive (send) transition also starting from an already reached control state with the internal transitions.

6. The method as recited in claim 1, wherein the system includes many copies of a same pushdown system (PDS), and verifying data race freedom includes interacting via pairwise and asynchronous rendezvous, disjunctive guards and nested locks to compute reachable states of a single PDS.

7. The method as recited in claim 1, wherein the system includes a plurality of pushdown systems (PDSs), and the PDSs interact via pairwise rendezvous where interactions between the PDSs are decidable for pairwise reachability.

8. The method as recited in claim 1, wherein verifying data race freedom includes verifying pairwise reachability for the control states of different programs.

9. A computer-readable storage medium storing a computer executable program for computing dataflow in concurrent programs, wherein the computer executable program when executed on a computer causes the computer to perform the steps of:
given a concurrent program, initializing a set of reachable control states;
based on the set of reachable control states, removing synchronization constructs between the control states that cannot be converted to internal transitions;
replacing the synchronization constructs with internal transitions;
adding new reachable control states uncovered by the removal of the synchronization constructs where the new reachable control states are discovered using model checking for single threads;
repeating the steps of removing, replacing and adding until there are no more reachable control states; and
verifying data race freedom of the plurality of concurrent programs by reviewing a complete set of reachable control states.

10. A method for computing dataflow in a computer program of a computer system, comprising:
modeling a concurrent program stored on a computer readable storage medium as a pushdown system with a number of configurations;
initializing a set of reachable control states;
based on the set of reachable control states, removing synchronization constructs that cannot be converted to internal transitions;
replacing the synchronization constructs with internal transitions;
model checking the system to determine context-free reachability to find new control states for single threads;
adding new reachable control states uncovered by the model checking;
iterating until no new control states are found; and
solving a parameterized model checking problem based on a complete set of reachable control states.

11. The method as recited in claim 10, wherein the internal transitions include a path between control states.

12. The method as recited in claim 10, wherein the internal transitions include a rendezvous send (receive) transition with a matching receive (send) transition in a set of control states.

13. The method as recited in claim 10, wherein replacing the synchronization constructs with internal transitions includes removing all synchronization constructs that are not converted to internal transitions.

14. The method as recited in claim 10, solving includes verifying data race freedom for the control states of different programs.

15. The method as recited in claim 14, wherein verifying includes determining decidable interactions for pairwise rendezvous, asynchronous rendezvous, disjunctive guards and nested locks.

16. The method as recited in claim 10, wherein the system includes a plurality of pushdown systems (PDSs), and the PDSs interact via pairwise rendezvous where interactions between the PDSs are decidable for pairwise reachability.

17. The method as recited in claim 10, wherein the system includes many copies of a same pushdown system (PDS), and solving a parameterized model checking problem includes verifying data race freedom via interactions of pairwise and asynchronous rendezvous, disjunctive guards and nested locks to compute reachable states of a single PDS.

18. A computer-readable storage medium storing a computer executable program for computing dataflow in a computer program, wherein the computer executable program when executed on a computer causes the computer to perform the steps of:
modeling a concurrent program as a pushdown system with a number of configurations
initializing a set of reachable control states;
based on the set of reachable control states, removing synchronization constructs that cannot be converted to internal transitions;
replacing the synchronization constructs with internal transitions;
model checking the system to determine context-free reachability to find new control states for single threads;
adding new reachable control states uncovered by the model checking;
iterating until no new control states are found; and
solving a parameterized model checking problem based on a complete set of reachable control states.

* * * * *